Figure 4A:
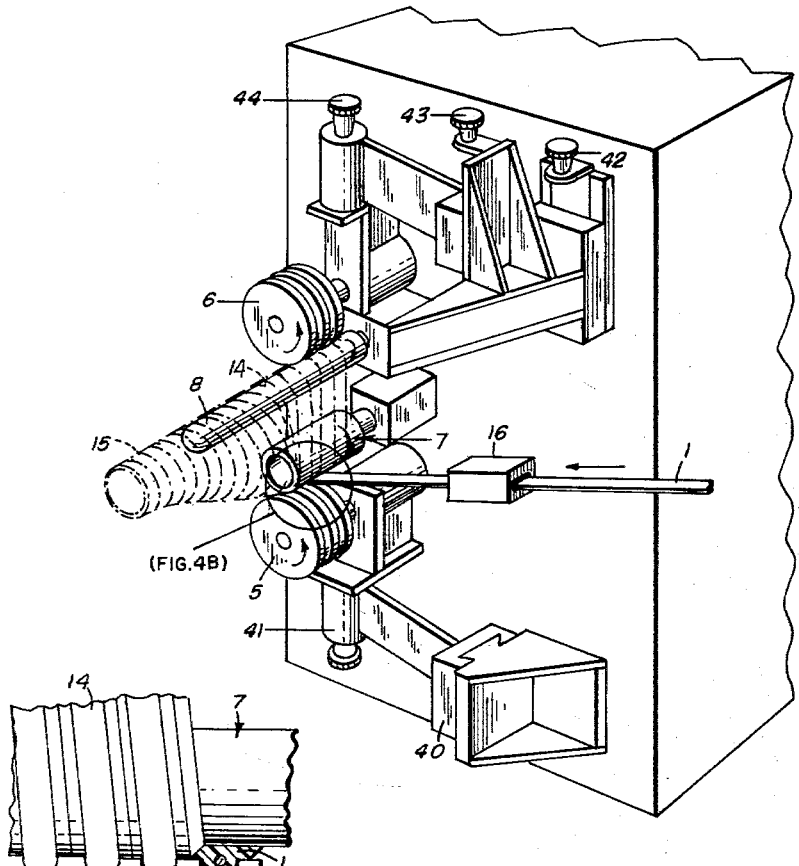

March 16, 1965  J. RIGAUT  3,173,822
APPARATUS FOR CONTINUOUSLY FORMING
THERMOPLASTIC FLEXIBLE TUBING
Filed July 25, 1960  3 Sheets-Sheet 1
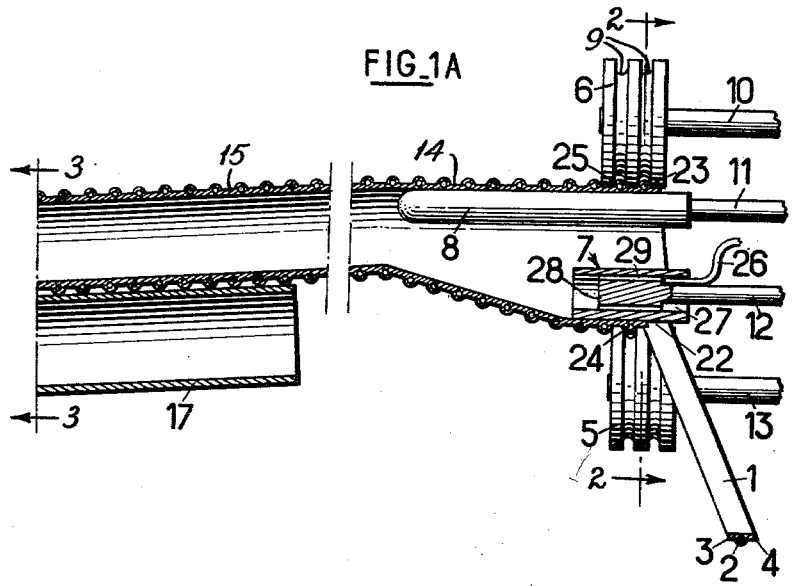
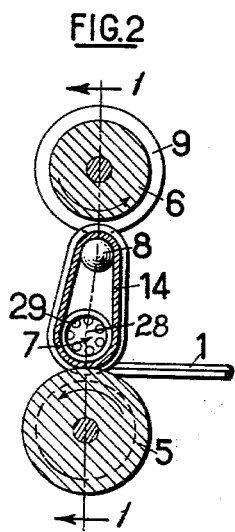
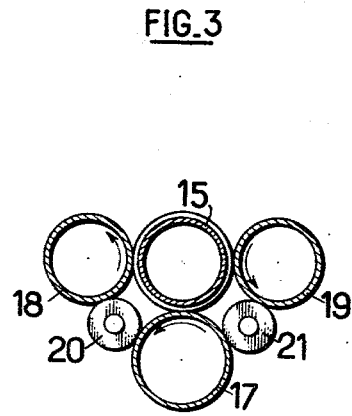

March 16, 1965  J. RIGAUT  3,173,822
APPARATUS FOR CONTINUOUSLY FORMING
THERMOPLASTIC FLEXIBLE TUBING
Filed July 25, 1960  3 Sheets-Sheet 2

United States Patent Office 3,173,822
Patented Mar. 16, 1965

3,173,822
APPARATUS FOR CONTINUOUSLY FORMING
THERMOPLASTIC FLEXIBLE TUBING
Jean Rigaut, 32 Ave. de Stalingrad, La Garenne
Colombes, France
Filed July 25, 1960, Ser. No. 44,918
Claims priority, application France, July 28, 1959,
801,515
12 Claims. (Cl. 156—429)

The manufacture of tubes by winding a band or strip of extrudable synthetic resin of thermoplastic material helically is already known. It is described, for example, in my patent application Serial No. 751,274. A band used in this process can have a central portion of circular or semi-circular cross section flanked by a pair of lateral coplanar portions or wings. Other forms are also known. Usually the band has, as a reinforcing member, a core of stiffer synthetic resin in the central portion. When the strip is wound, the wings are welded together to connect the coils.

Up to now the welding of the coils has been carried out by winding the band, as it is extruded, on a rotating mandrel which is moved axially in such a manner that the helical coils are formed edge to edge with a slight overlap. This process is necessarily discontinuous. Difficulties may arise through the hot band sticking to the mandrel. It has also been suggested that the band should be removed from the mandrel as it is wound and welded. In this case the mandrel does not move axially and the tube is moved away axially by a helical guide at its rate of formation. However, it is very difficult to move the tube formed in this manner along the mandrel due to the adhesion of the band to the latter, while if the mandrel is cooled welding is difficult.

The present invention concerns improvements in this process. The improvements can be applied separately in certain cases but they can also, perhaps more advantageously, be applied in combination.

The first improvement consists in using a two-part internal mandrel. The tube is formed on the mandrel with a more or less oval cross section and assumes a circular cross section as it leaves the mandrel.

The second improvement consists in replacing the helical guide of the known process referred to above by means which cause a self-guiding effect to be exerted on the tube. This is achieved by making use of the central reinforced portion of the band which projects as a rib on the tube after formation. The rib, which is helical on the tube, is guided by peripheral grooves in rolls which press the tube being formed against both parts of the mandrel. The grooves in one of the rolls are suitably offset from those in the other roll so as to conform to the helical arrangement of the rib on the coils making up the tube.

The third improvement consists in using an artificially cooled mandrel in the tube as it is formed.

The fourth improvement, which is only used under certain operating conditions, consists in having means 16 for heating the band just before it engages the first roll and cooled mandrel. The choice of this position for applying heat enables the band to be heated without damage. Other positions have in the past been found unsuccessful.

Figure 4B:
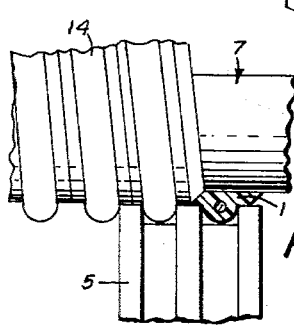
Figure 1B:
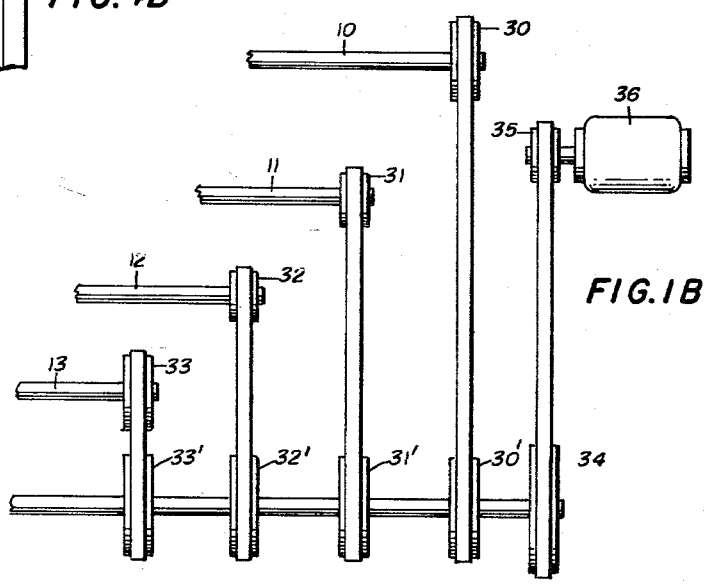
Figure 5:
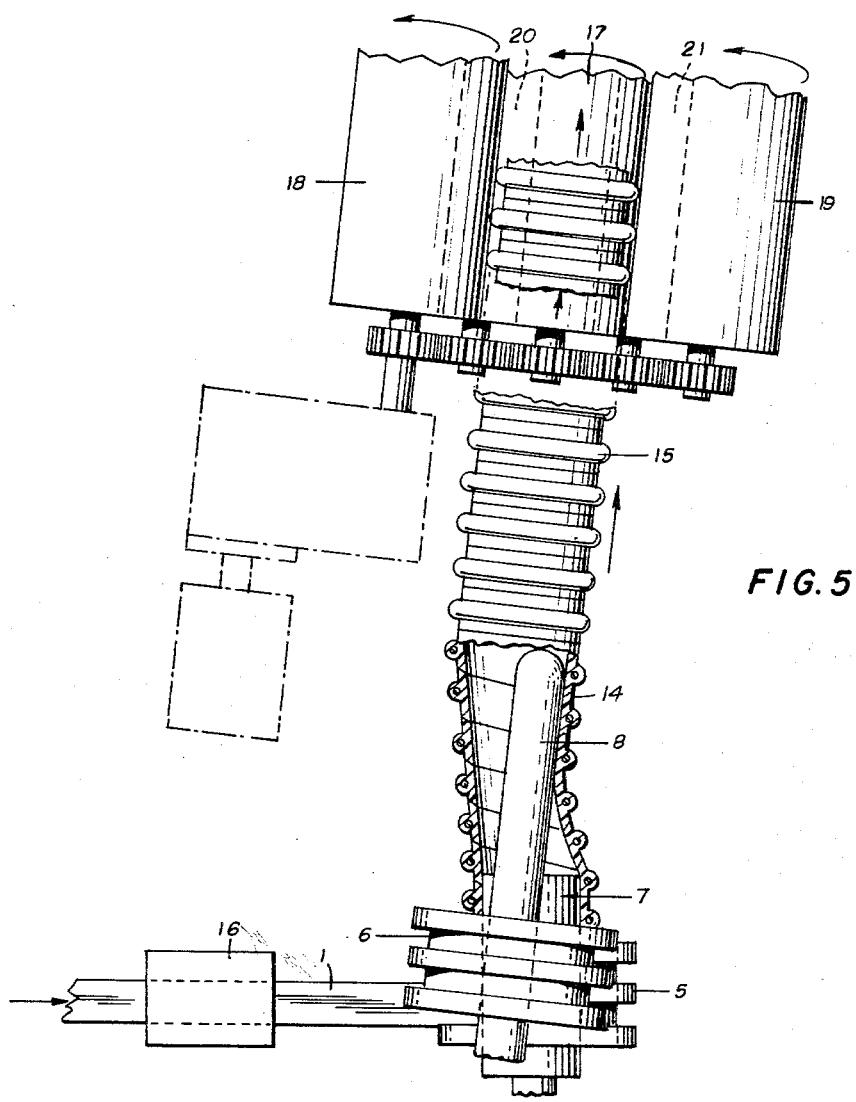

Other features of the invention, such as the relation between the lengths of the two mandrel parts, the angle at which their axes are offset and the use of a rotary guide system will be made clear by the following description of one embodiment of the invention, given for example only with reference to the accompanying drawings, in which:

FIGURE 1A is a diagrammatic section on the line I—I of FIGURE 2 to show the general layout of the apparatus,
FIGURE 1B completes FIGURE 1A,
FIGURE 2 is a section on the line II—II of FIGURE 1,
FIGURE 3 is a section on the line III—III of FIGURE 1,
FIGURE 4A is a perspective view of the device,
FIGURE 4B is an enlarged view of the encircled area of FIGURE 4A, and
FIGURE 5 is a plan view of the device with part of the tubing being made being cut away.

The apparatus comprises a two-part mandrel 7 and 8 on which a band 1 of synthetic resin is wound so that at the moment of its formation the tube is oval, with the wall 14 almost vertical (see FIGURE 2).

The tube is supported to the left in a cradle of three hollow cylinders 17, 18 and 19 rotating in the same direction. Two of these cylinders are driven from the other through two idlers 20 and 21.

The two mandrel parts 7 and 8 and their shafts 11 and 12 are set at a small angle to each other, as seen in FIG. 5, to facilitate helical winding. The shaft 11 is parallel with a shaft 10 carrying a roll 6 having two peripheral grooves 9. The shaft 12 is parallel with a shaft 13 bearing a similar roll 5. Each mandrel and the cooperating roll constitute a pair of superimposed driven rolls, each pair constituting pressure and guiding means for the strip. The grooves in the two rolls 5 and 6 are offset along the axis of the tube 15 by half their pitch so as to correspond to the pitch of the helical coils on the mandrel. Mandrel part 7 and roller 5 constitute a pair of rolls forming primary pressure and guiding means, and mandrel part 8 and roller 6 constitute a pair of rolls forming secondary pressure and guiding means. The shafts 10, 11, 12 and 13 are driven separately.

In case additional heat is required it may be applied at 16 by any known heating means.

It would of course be possible to provide by use of conventional mechanisms means for adjusting the space between the mandrel parts and for adjusting the nip exerted on the tube as it passes between them and the rolls 5 and 6, as by means 41, 42, 43 and 44 in FIGURE 4.

The lower mandrel part 7 is cooled by compressed air through a pipe 26. The air passes into a tubular space 27 through a series of longitudinal canals 29 and then into the hollow end 28 of the mandrel. This cooling is found to prevent the band 1 from sticking to the mandrel. If needed, it would also be possible to cool the other mandrel and the rolls 5 and 6.

As seen in cross section in the lower part of FIGURE 1A, the band 1, which is extruded close to the apparatus, has a central portion containing a stiffening core 2 and two wings 3 and 4.

In FIGURE 4A, means 43, 44 provide means to adjust the spacing between axes 10 and 11, and means 41 provide means to adjust the spacing between shafts 12 and 13. Element 42 adjusts the distance between mandrel parts 7 and 8. These means are conventional slide and screw devices. The spacing of the rollers between which the strip is fed once adjusted does not need to be changed. The pressure between each pair of rollers is provided because of their location, not because their location is adjustable.

The operation of the apparatus is as follows:

The band 1 is wound, preferably at a temperature near that of extrusion, by rotating the shafts 10, 11, 12 and 13. The band passes between the roll 5 and the mandrel part 7 at 22, then upwardly to pass between roll 6 and mandrel part 8 so that it forms helical coils, the first two of which are indicated by 23 and by 24 and 25. The central portion of the band passes into the groove without compression on the right side of the roll 5, as seen in FIGURE 1A, so that its left-hand wing 3 overlaps the wing of the coil which has already been formed, between 22 and 24. The amount of overlap can be adjusted. The overlapping portions are compressed between the roll 5 and the mandrel part 7 so that they are welded together.

The strip, now welded to the former convolution, passes successively at 23, 24 and 25, these references designating the places where the structure is guided by the rolls 5 and 6 alternately.

After leaving the mandrel 7 the tube is supported by the upper mandrel part 8. After passing off the end of the latter, the tube is supported by the leading member of the cradle, in this case the cylinder 17. The cradle members rotate at such a speed that there is no twisting of the tube between them and the mandrels. The cradle is driven through roller 18, then via gear 20, roller 17, gear 21, to roller 19.

What I claim is:

1. In an apparatus for continuously forming flexible hoses of the type formed of a strip of flexible material including a continuous rib having fins along its longitudinal edges and with a reinforcing member of thermoplastic material embedded in the rib formed into an integral structure constituted by a succession of convolutions of equal diameter, the adjacent fins of adjacent convolutions being secured together, said apparatus comprising first pressure and guiding means to weld the adjacent fins together in a continuous seam and second pressure and guiding means, said second pressure and guiding means being at a distance apart, in a direction perpendicular to the axis of helical movement of the flexible hose as it is formed, from said first pressure and guiding means, whereby the helical displacement of the flexible hose structure is secured.

2. In an apparatus for continuously forming flexible hoses from a strip of flexible material said flexible material comprising a continuous rib having fins along its longitudinal edges and with a reinforcing member of thermoplastic material embedded in the rib, said strip adapted to be formed into a flexible tube structure by a succession of convolutions of equal diameter, the adjacent fins of adjacent convolutions being welded together, said apparatus comprising a pair of superimposed driven rolls, into the nip of which said strip is fed, at least one of said rolls having a pair of axially spaced grooves to receive said rib, said rolls being located so as to apply pressure on said strip when it is between said rolls, a second pair of superimposed rolls, into the nip of which said strip passes, at least one of said rolls of said second pair having at least one groove to receive said rib, the convolutions of said flexible tube encircling one roll of each pair of rolls, said second pair being driven whereby the displacement of the tube structure is secured.

3. In an apparatus for continuously forming flexible hoses of the type comprising a strip of flexible material comprising a continuous rib having fins along its longitudinal edges and with a reinforcing member embedded in the rib, said strip being formed into an integral flexible hose structure constituted by a succession of convolutions of equal diameter, the adjacent fins of adjacent convolutions being welded together, said apparatus comprising a first pair of superimposed rolls, into the nip of which said strip is fed, at least one of said rolls having at least a pair of axially spaced annular grooves to receive said rib, means to apply pressure on at least one of said rolls towards the other one, and means for rotating said rolls, a second pair of superimposed rolls, into the nip of which said strip of material passes, at least one of said rolls of said second pair having at least one groove to receive said rib, and means to move at least one of the rolls of said pair of rolls towards the other roll of said second pair, said strip passing again into the nip of said first pair of rolls to form helical convolutions of said strip, and means for rotating the rolls of said second pair whereby the convolutions of the flexible tube structure encircling one roll of each pair of rolls are displaced axially.

4. An apparatus as set forth in claim 3 in which the one roll of a pair of rolls which is encircled by the flexible hose being formed has a greater diameter than the roll of the other pair of rolls which is encircled by said flexible hose being formed whereby the flexible hose during fabrication takes a shape having an oval cross section.

5. An apparatus for continuously forming flexible hoses formed from a strip of preheated flexible material including a continuous rib having fins along its longitudinal edges and having a reinforcing member embedded in the rib, said strip being wound into a succession of convolutions of equal diameter to form a hose with the adjacent fins of adjacent convolutions being welded together, said apparatus comprising a first and a second pair of pressure and guiding rolls through the nip of which said preheated strip passes to continuously weld the adjacent fins of said strip together, said preheated strip encircling one roll of each said pair of rolls so that one roll of each pair of rolls is within the hose being formed, means to simultaneously cause the helical movement of the hose as it passes through the first and second pairs of rolls, and cooling means to cool at least the roll of the first named pair which is inside of the hose.

6. In a device to form a helically wound tube including a mandrel means over which said tube is to be formed by helically winding a strip of material thereon, said mandrel means being formed as two rotatable mandrels at a distance one from the other each rotatable about its own axis about both of which mandrels the strip of material is wound, both mandrels projecting inside of the tube, said axes lying at a small angle to each other to facilitate the helical winding of the strip thereabout, and presser rolls arranged one for each of said rotatable mandrels, said presser rolls lying exteriorly of the tube as it is formed and pressing the tube against said mandrels, each of said presser rolls rotating on an axis parallel to the axis of the mandrel with which it is associated.

7. In an apparatus for continuously forming flexible hoses of the type comprising a strip of flexible material having a continuous rib and having fins along the longitudinal edges of the strip and having a reinforcing member embedded in the rib, said strip being wound into a succession of convolutions of equal diameter, the adjacent fins of adjacent convolutions being welded together, said apparatus comprising pressure and guiding means to weld continuously the adjacent fins together and cause simultaneously the helical movement of the structure, and a cradle to receive continuously said structure as said structure moves from said rolls, said cradle comprising supporting rollers disposed lengthwise with respect to the direction of said rolls, and means for rotating said rollers to rotate the structure.

8. In an apparatus for continuously forming flexible hoses from a strip of thermoplastic material, said strip comprising a continuous rib having fins along its longitudinal edges and with a reinforcing member of thermoplastic material embedded in the rib, the fins being relatively thin as compared to the thickness of the rib, said apparatus comprising means for winding said strip spirally with the fins of the adjacent ribs overlapping, and means for causing the fins to adhere together by application of pressure to form an integral structure, said winding means including a pair of superimposed rolls, at least one of which has at least a pair of axially spaced grooves formed on its surface and shaped to receive said rib therein, in combination a second pair of superimposed rolls, at least one of which has at least one groove formed on its surface and shaped to receive said rib, said second pair of rolls being disposed in spaced relation relatively to said first pair and positioned to receive at least the first loop of said strip in the nip of the rolls which is looped back on itself after passage between the rolls of said first pair.

9. An apparatus according to claim 8, in which means are provided for heating the strip just before it enters the nip between the rolls of said first pair of rolls.

10. An apparatus according to claim 8, including means for cooling at least one of the rolls.

11. An apparatus according to claim 8, in which the parallel axes of the rolls of said first pair of rolls are set at a slight angle relative to the parallel axes of the second pair of rolls.

12. In combination, an apparatus for continuously forming flexible hoses from a strip of thermoplastic material, said strip comprising a continuous rib having fins along its longitudinal edges and with a reinforcing member of thermoplastic material embedded in the rib, the fins being relatively thin as compared to the thickness of the rib, said apparatus comprising winding means for winding said strip spirally with the fins of the adjacent ribs overlapping, means for causing the fins to adhere together by application of pressure to form an integral structure, said winding means including a pair of superimposed rolls, at least one of which has a pair of axially spaced grooves formed on its surface shaped to receive said rib therein, and a cradle disposed a distance from said apparatus and positioned to receive the formed hose as it exits from said apparatus, said cradle comprising at least two rotary rolls adjacent each other and having their axes parallel to each other, and means for rotating said rolls.

References Cited in the file of this patent

UNITED STATES PATENTS

| | | |
|---|---|---|
| 2,048,360 | Spanel et al. | July 21, 1936 |
| 2,516,864 | Gilmore et al. | Aug. 1, 1950 |
| 2,674,296 | Bringolf | Apr. 6, 1954 |
| 2,713,381 | Seck | July 19, 1955 |
| 2,731,040 | Warburton | Jan. 17, 1956 |
| 2,759,521 | Hall et al. | Aug. 21, 1956 |